Figure 1:
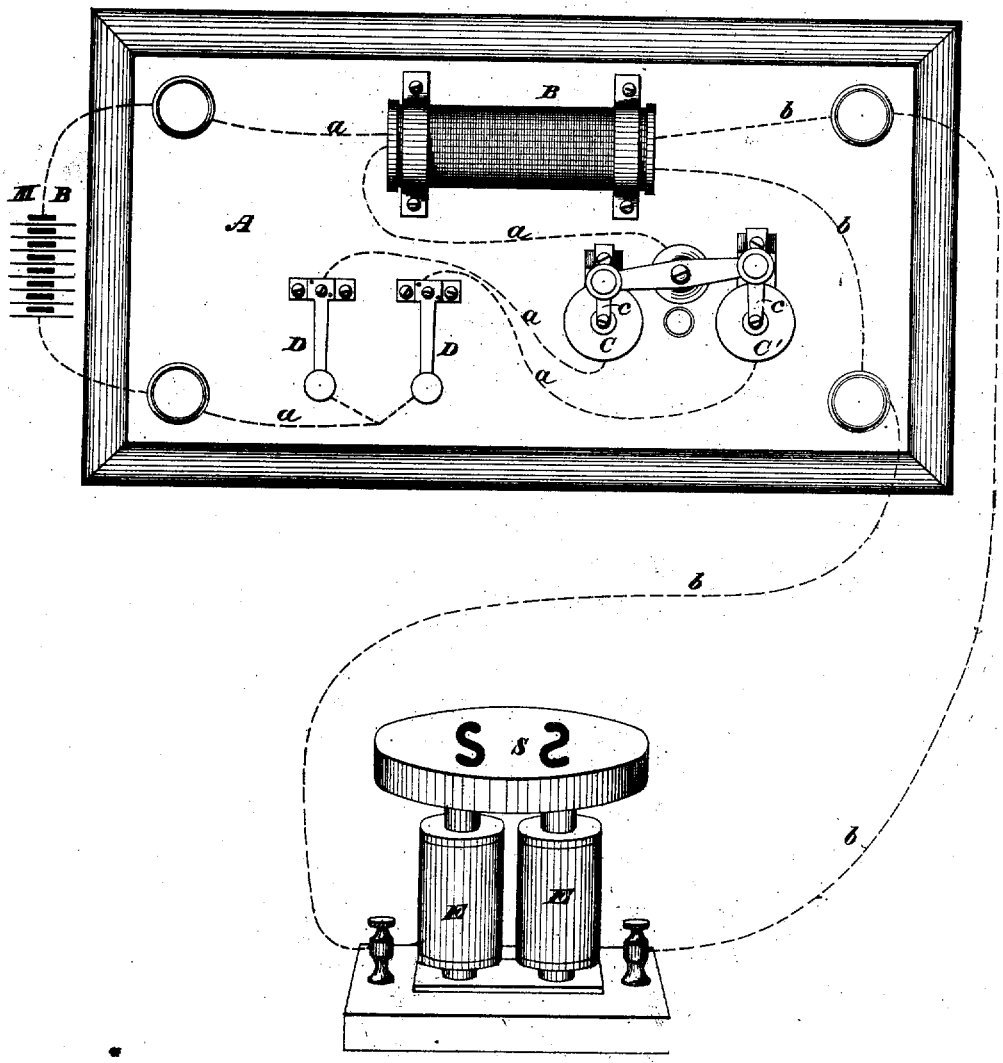

2 Sheets—Sheet 1.

E. GRAY,

Assignor, by mesne Assignments, to THE HARMONIC TELEGRAPH CO.

Apparatus for Transmitting Musical Impressions or Sounds Telegraphically.

No. 8,559. Reissued Jan. 28, 1879.

WITNESSES

Wm. A. Skinkle

Roberdeau Buchanan.

By his Attorneys

Baldwin Hopkins & Peyton

INVENTOR

Elisha Gray

E. GRAY,

Assignor, by mesne Assignments, to THE HARMONIC TELEGRAPH CO.

Apparatus for Transmitting Musical Impressions or Sounds Telegraphically.

No. 8,559. Reissued Jan. 28, 1879.

*WITNESSES*

Wm. a. Skinkle.

Roberdeau Buchanan.

*INVENTOR*

Elisha Gray

*By his Attorneys*

Baldwin, Hopkins & Peyton

UNITED STATES PATENT OFFICE.

ELISHA GRAY, OF CHICAGO, ILLINOIS, ASSIGNOR, BY MESNE ASSIGNMENTS, TO THE HARMONIC TELEGRAPH COMPANY, OF NEW YORK CITY.

IMPROVEMENT IN APPARATUS FOR TRANSMITTING MUSICAL IMPRESSIONS OR SOUNDS TELEGRAPHICALLY.

Specification forming part of Letters Patent No. 166,095, dated July 27, 1875; Reissue No. 8,559, dated January 28, 1879; application filed May 7, 1878.

DIVISION B.

*To all whom it may concern:*

Be it known that I, ELISHA GRAY, of Chicago, in the county of Cook and State of Illinois, have invented certain new and useful Apparatus for Transmitting Musical Impressions or Sounds Telegraphically, of which I hereby declare the following to be a full, clear, and exact description.

My invention relates to what I term an "electro-harmonic telegraph," and is based upon the fact, well known to electricians, that an electro-magnet elongates under the action of an electric current, and contracts again when the current ceases; consequently a succession of impulses or interruptions will cause the magnet to vibrate, and if these vibrations be of sufficient frequency a musical tone will be produced, the pitch of which will depend upon the rapidity of the vibrations.

The object of my present invention is to utilize this discovery for the transmission of intelligible signals to a distance by electricity, which ends I attain, first, by employing a diaphragm or disk of metal, (capable of responding to all kind of tones,) vibrating in unison with an electro-magnet included in an electric circuit, to reproduce audibly rhythmical impulses or vibrations representing musical impressions or sounds, or tones transmitted through said circuit; second, by employing a sound-intensifying chamber or resonator, having a disk or diaphragm, responsive to rhythmical impulses or vibrations representing musical impressions or sounds, whereby said rhythmical impulses or vibrations are intensified and rendered audible; third, by combining an electric circuit, a sound-intensifying chamber or resonator, and a metal disk or diaphragm, acted upon through the intervention of an electro-magnet included in the circuit, to intensify and render audible rhythmical impulses or vibrations representing musical impressions or sounds produced in said magnet; fourth, by employing induced currents to reproduce upon a disk or diaphragm of metal (through the intervention of a magnet) rhythmical vibrations representing musical impressions or sounds; fifth, by employing a transmitter consisting of a coil or helix inducing rhythmical electric impulses or vibrations in an electric circuit without interrupting its continuity, and a receiver consisting of an electro-magnet having a metal disk or diaphragm for its armature; sixth, by combining a telegraphic circuit, a series of circuit-breakers capable of producing musical tones of different pitch, a series of keys for throwing said circuit-breakers into or out of operation, and an electro-magnet receiver vibrated by the transmitters.

Figure 2:
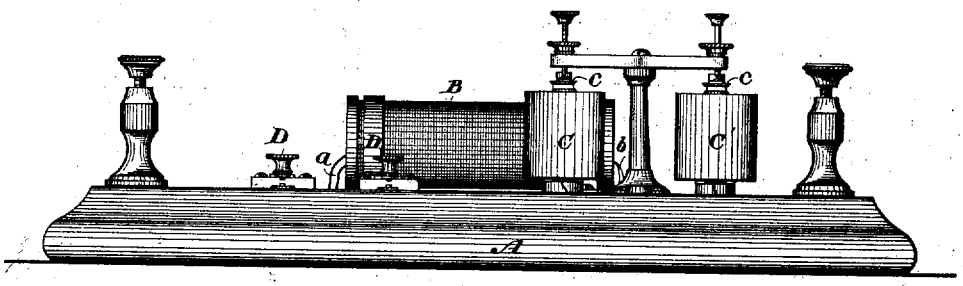
Figure 3:
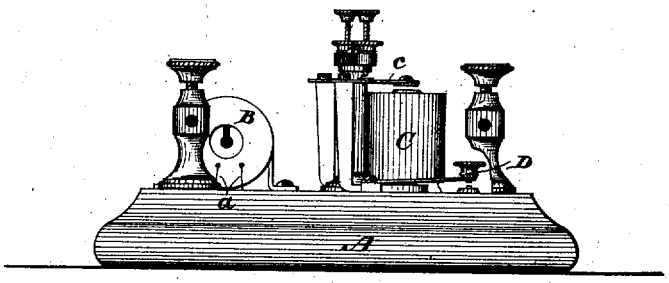
Figure 4:
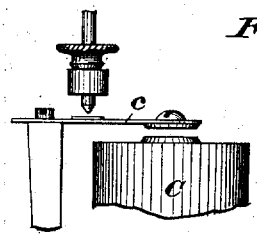

In the accompanying drawings, Figure 1 represents an arrangement upon circuit of apparatus which I use for carrying out the objects of my invention, the transmitting part of the apparatus being shown in plan and the receiver in perspective; and Fig. 2 represents a view, in elevation, of the transmitting apparatus; Fig. 3, an end view thereof, and Fig. 4 a detail view of one of the rheotomes.

In the apparatus shown I make use of induced currents from either a primary or secondary coil for affecting the vibrating bar or core of an electro-magnet, and cause the necessary succession of said currents by interruption in the primary circuit made by an automatic or mechanical circuit-breaker.

The transmitting apparatus is mounted upon a suitable frame or base, A. An ordinary induction-coil, B, has the usual primary and secondary circuits *a b*. Automatic vibrating electrotomes C C′, of the usual construction, have their vibrating circuit-closing springs *c* so adjusted that when in action they produce musical tones, which, from the difference in adjustment and the length and thickness of the springs, are of different pitch. A common telegraph-key, D, is placed in the primary circuit, to make or break the battery-connection.

In the drawings I have shown two electrotomes of identical construction, but of different pitch, and two keys. Both the keys and electrotomes are in the primary circuit, which is so divided that part of the circuit passes through each key and its corresponding electrotome. The number of electrotomes may be increased, so that tones extending through two or more octaves may be produced.

At the receiving-station an electro-magnet, E, is placed in circuit. A hollow box, drum, cylinder, or resonator, S, of metal, is placed on the poles of the magnet. This resonator, it will be observed, is composed of a circumferential band having two end walls, disks, or diaphragms, one of which rests upon the magnets, constituting an armature therefor, and vibrating in unison therewith, while the other is perforated with S-shaped openings, somewhat like the sounding-board of a violin, thus constituting what I call a "common receiver"—that is, one capable of responding to or reproducing tones of all kinds.

The operation of the apparatus is as follows: Under the arrangement shown in the drawings, when a key is closed, the primary circuit will pass from the battery M B through the wires *a*, the key, and its corresponding electrotome, and will be automatically interrupted in the usual manner. The spring of the electrotome will thus be caused to vibrate rapidly, and to produce a tone the pitch of which is determined by the rate of vibration. It is obvious that several keys may be closed or depressed simultaneously. The rhythmical impulses, vibrations, or interruptions of the current representing the tones will simultaneously produce in the secondary circuit, *b*, of the induction-coil a series of induced currents, impulses, or vibrations corresponding in number with the vibrations of the electrotome; and, as the receiving electro-magnet E is connected with this circuit, it will be caused to vibrate correspondingly, thus producing a tone or tones of corresponding pitch with those received from the transmitting apparatus. These tones are audibly reproduced and their sound intensified by the use of the hollow box, cylinder, sound-intensifying chamber, or resonator above mentioned. The circuit may obviously be extended to any distance desired from the transmitting-station.

When a single electrotome is thrown into vibration, its corresponding tone will be reproduced on the sounder or resonator S by the magnet. When electrotomes of different pitch are successively operated, their tones will be correspondingly reproduced by the receiver; and when two or more electrotomes are simultaneously sounded the tone of each will still be reproduced without confusion in the sounder or resonator S, by which means I am enabled to reproduce composite tones, melodies, or tunes.

Mechanical circuit-breakers may be substituted for the automatically-vibrating electrotomes hereinbefore described. I have, in fact, used such mechanical circuit-breakers of various construction; but I have found the electrotome more satisfactory in practice. In this instance the receiver is shown and described as operated by the induced current of the secondary coil; but the secondary or extra current of the primary coil may be used instead thereof with good effect.

The above-described apparatus is especially adapted to telegraph on long land and submarine lines. By it letters and signals can be represented by tones differing in pitch; or the ordinary Morse signals can be made by short and long interruptions in a prolonged tone of the same pitch, thus insuring great rapidity of transmission.

I do not broadly claim herein an art, method, or system of transmitting musical impressions or sounds telegraphically, as that constitutes the subject-matter of another division of this application filed herewith.

Letters Patent of the United States No. 166,096, granted to me July 27, 1875, (on an application originally filed April 18, 1874,) show an apparatus somewhat similar to the one herein described, for transmitting musical tones through an electric circuit composed, in part, of animal-tissue and a resonant metallic receiver, but without the intervention of a magnet. I do not therefore claim herein anything shown in said application. Neither do I claim herein the combination, with a main line, of an intermittent circuit-breaker, or a series thereof, each adapted to throw upon the line a definite number of electrical impulses per unit of time, and a key or keys, one for, and controlling each of, said circuit-breakers, as such combination constitutes the subject-matter of another application for Letters Patent of the United States filed by me February 23, 1875.

The combination of a telegraph-circuit, an automatic circuit-breaker capable of producing a musical tone, and an electro-magnet receiver for reproducing the tone by being thrown into vibrations by impulses generated by the circuit-breaker is not broadly claimed herein, as this combination constitutes a part of the subject-matter of my said application also.

But neither of the said applications above mentioned shows a diaphragm or a sound-intensifying chamber or resonator in combination with a magnet.

I claim as of my own invention—

1. The diaphragm or disk of metal, capable of responding to all kinds of tones, vibrating in unison with the electro-magnet included in the electric circuit, substantially as set forth.

2. The sound-intensifying chamber or resonator, having a disk or diaphragm of metal, responsive to rhythmical impulses or vibrations representing musical impressions or sounds produced in the electric circuit through the intervention of the electro-magnet, substantially as set forth.

3. In combination, the electric circuit, the sound-intensifying chamber or resonator, the diaphragm or disk of metal, and the electro-magnet, the two latter vibrating responsively to rhythmical impulses or vibrations representing musical impressions or sounds transmitted through said circuit, substantially as set forth.

4. In combination, the primary circuit, the secondary circuit, the electro-magnet, and the disk or diaphragm of metal, responsively vibrated by induced currents of electricity to reproduce rhythmical impulses or vibrations representing musical impressions or sounds, substantially as set forth.

5. In combination, the transmitter consisting of a coil or helix, whereby rhythmical electrical impulses or vibrations may be induced in the telegraphic circuit without interrupting the continuity of the same, and the receiver consisting of the electro-magnet, having the metal disk or diaphragm for its armature, these being arranged to vibrate in unison with each other, and with the impulses or vibrations proceeding from the transmitting or inducing coil, substantially as set forth.

6. In combination, a telegraph-circuit, a series of circuit-breakers capable of producing musical tones of different pitch, a series of keys for throwing said circuit-breakers into or out of operation, and an electro-magnet receiver which is thrown into vibration by the transmitters, whereby tones of different pitch may be reproduced at the receiving end of the line by the employment of a single circuit, substantially as set forth.

In testimony whereof I have hereunto subscribed my name.

ELISHA GRAY.

Witnesses:
A. G. SWARTWOUT,
D. M. ERSKINE, Jr.